US011070351B1

(12) United States Patent
Chepuri

(10) Patent No.: US 11,070,351 B1
(45) Date of Patent: Jul. 20, 2021

(54) CONTROLLER AND METHOD FOR DATA COMMUNICATION

(71) Applicant: Faraday Technology Corp., Hsinchu (TW)

(72) Inventor: Raghu Nandan Chepuri, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 0 days.

(21) Appl. No.: 17/138,910

(22) Filed: Dec. 31, 2020

(51) Int. Cl.
*H04L 7/00* (2006.01)
*H04L 25/03* (2006.01)
*H04L 25/49* (2006.01)

(52) U.S. Cl.
CPC .......... *H04L 7/0041* (2013.01); *H04L 7/0058* (2013.01); *H04L 7/0087* (2013.01); *H04L 25/03057* (2013.01); *H04L 25/4917* (2013.01)

(58) Field of Classification Search
CPC ... H04L 7/0041; H04L 7/0058; H04L 7/0087; H04L 25/030257; H04L 25/4917
See application file for complete search history.

(56) References Cited

U.S. PATENT DOCUMENTS 9,083,366 B1 * 7/2015 Annampedu ......... H04L 7/0331

* cited by examiner

*Primary Examiner* — Curtis B Odom
(74) *Attorney, Agent, or Firm* — JCIPRNET

(57) ABSTRACT

The controller includes a first equalizer, a first detector, a second detector, a multiplexer, a data clock generator, and a second equalizer. The first equalizer is configured to receive and equalize the input data. The first detector is configured to detect optimum phase of the input data. The optimum phase of the input data represents the input data peak. The second detector is configured to generate an envelope data according to the input data and detect peak of envelop with respect to sampling phase. The data clock generator is configured to generate the recovered data clock. The second equalizer is configured to generate the recovered data. The multiplexer is configured to generate an offset value according to the input data peak and the envelope data peak. The offset value represents the recovered data clock having an optimum sampling frequency and an optimum sampling phase.

20 Claims, 13 Drawing Sheets

CONTROLLER AND METHOD FOR DATA COMMUNICATION

BACKGROUND

The disclosure relates to a technology for data communication, and more particularly a controller and method for recovering (Pulse-Amplitude Modulation 4) PAM-4 data and data clock at optimum frequency and phase.

Recently, the technology for data communication encounters a challenge to create a small and compact device with faster data rate, as such, the needs of the user for high data rate communication can be fulfilled and a production cost can be reduced accordingly. One of the examples of this situation is the production line of the automation factory that utilize an extremely huge amount of device that needs to be monitored. Each device generates a huge amount of data including high quality images and videos. All data collected from the plurality of device needs to be transmitted to the control center in the relatively same time, as such a manager of the automation factory can determine the current status of the production line. Moreover, since the manager is not always standby in the production site, the manager may use the mobile device to receive all the data in order to be able to monitor the current status of the production line. Therefore, the need of creating the compact device that is able to receive an extremely huge amount of data is highly demanded. In addition, the transmission of the data having high data rate (i.e., PAM-4) may generates some interference such as Inter Symbol Interference (ISI), as such, the data received by the receiver is not able to be recovered perfectly and a high Bit Error Rate (BER) is generated. Moreover, the huge amount of data is usually transmitted by the transmitter without including the data clock. However, in order to generate the recovered data having small BER, the data clock needs to be recovered correctly in term of frequency and phase. Accordingly, the electronic circuits of the device should be reduced in order to compress the production cost.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
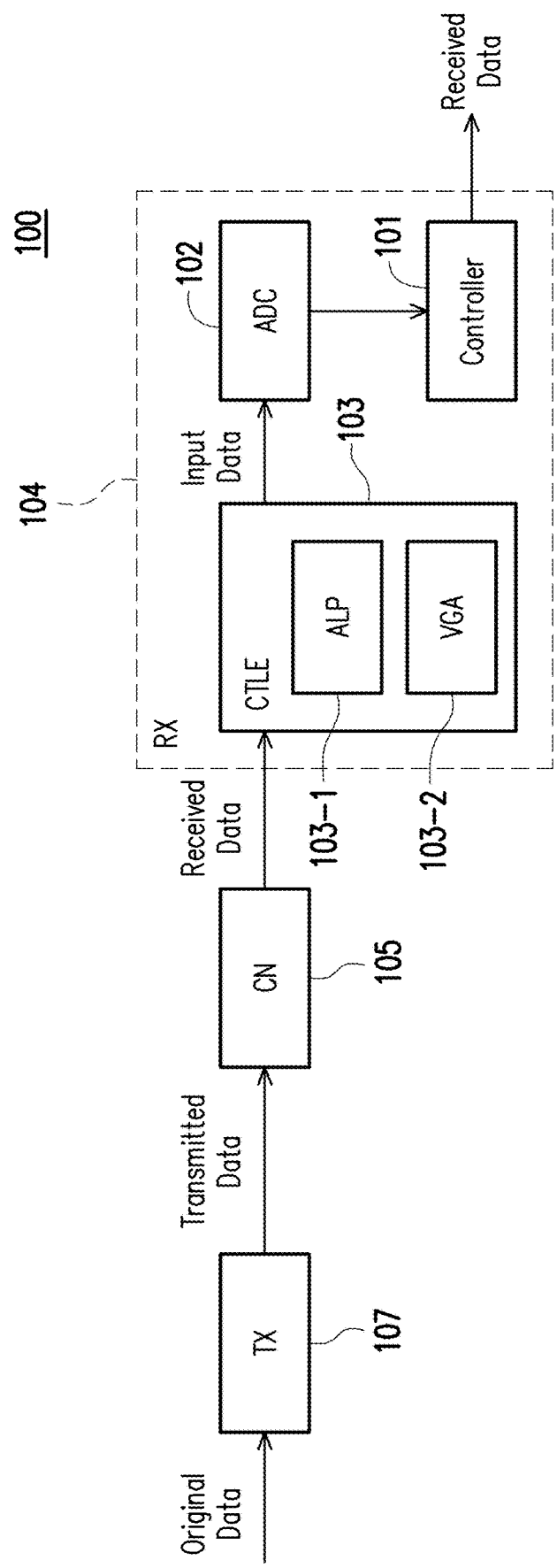
FIG. 1 schematically illustrates a block diagram of a data communication system according to an embodiment of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure discloses the apparatus and method for receiving the data at high data rate, and the apparatus is created to be compact in order to reduce the production cost. One of the circuits used for recovering the data and the data clock is Mueller-Muller. However, Mueller-Muller is effective for recovering the clock from the incoming data if ISI is not very high. In the case of the data having high data rate, PAM-4 encoding and strong ISI, Mueller-Muller is not able to recover the data and the data clock perfectly in terms of the frequency and the phase of the recovered data clock. The reason why Mueller-Muller is not able to recover the data clock perfectly for PAM-4 data is that the impulse response of the channel is not symmetric. Since the received data or the impulse response of the received data is not symmetric and Mueller-Muller detects an estimated peak (cursor data sample) according to a condition that pre-cursor data and a post-cursor data having the same level, the estimated peak is different from the true peak. Therefore, in an embodiment of the disclosure, an envelope detector is proposed to address this issue. The envelope detector detects the true peak of the received data by performing some functions based on a digital signal processing principal. Moreover, the apparatus only needs one Analog to Digital Converter (ADC) running at a rate of one sample per symbol (1×) frequency sampling to sample the analog data received by the receiver to the digital data, as such, the use of an additional ADC or the ADC having a rate of two samples per symbol (2×) frequency sampling is avoided. Therefore, the apparatus size is compact and the apparatus production cost is reduced.

Specifically, the detail of the disclosure on how to implement and configure the envelope detector to improve the function of Mueller-Muller detector to recover the data and the data clock of the received data received by the receiver is provided as follows.

FIG. 1 illustrates a block diagram of a data communication system according to an embodiment of the disclosure. The data communication system 100 may be implemented as an electronic mobile device or a communication electronic device having one or more transmitter, receiver, or a combination thereof. In the embodiment, the data communication system 100 may be applied to a plurality of the communication electronic devices connected via wire lines or wireless lines.

Referring to FIG. 1, the data communication system 100 includes a transmitter (TX) 107, a channel (CN) 105, and a receiver (RX) 104. The receiver 104 includes a continuous time linear equalizer (CTLE) 103, an analog digital converter (ADC) 102, and a controller 101. The CTLE 103 includes an analog linear processing unit (ALP) 103-1 and voltage gain amplifier (VGA) 103-2. The transmitter 107 is coupled to the channel 105. The transmitter 107 receives original data and transmit a transmitted data to the channel 105. The channel 105 is coupled to the CTLE 103 of the receiver 104. The channel 105 carries the transmitted data from the transmitter 107 to the receiver 104. The transmitted data that arrived at the receiver 104 is a received data. The received data may have different amplitude with the transmitted data and contain noises generated from a plurality of interferences including ISI. The received data may be analog data. The CTLE 103 is coupled to the ADC 102. The transmitter passes through the received data to the ADC 102 as an input data. The received data has been processed by the CTLE 103 (ALP 103-1) to attenuate low frequency data. The received data has been further processed by the CTLE 103 (VGA 103-2) to amplify the data. The ADC 102 is coupled to a controller 101. The ADC 102 convert the input data received from the CTLE 103 from analog data to digital data. The digital data may have a plurality of amplitude/levels including two levels, four levels, or more than that. The controller 101 generates the recovered data according to the input data that has been converted by the ADC 102. In the embodiment, the transmitter 107, the receiver 104, the ADC 102, and the controller 101 may be implemented by a plurality of electronic circuits. In the embodiment, the channel 105 may be implemented as physical wires cable or wireless line including signal. In the embodiment, the controller 101 may be a processor, a field programmable gate array (FPGA), an application specific integrated circuit (ASIC), or any integrated programmable on chip. In the embodiment, the receiver may be implemented by a 56 Gbps SERDES receiver or a PCIE Gen-6 receiver. The CTLE 103 may be implemented by 2 poles and 1 zero filter with adjustable voltage gain amplifier.

Figure 2:
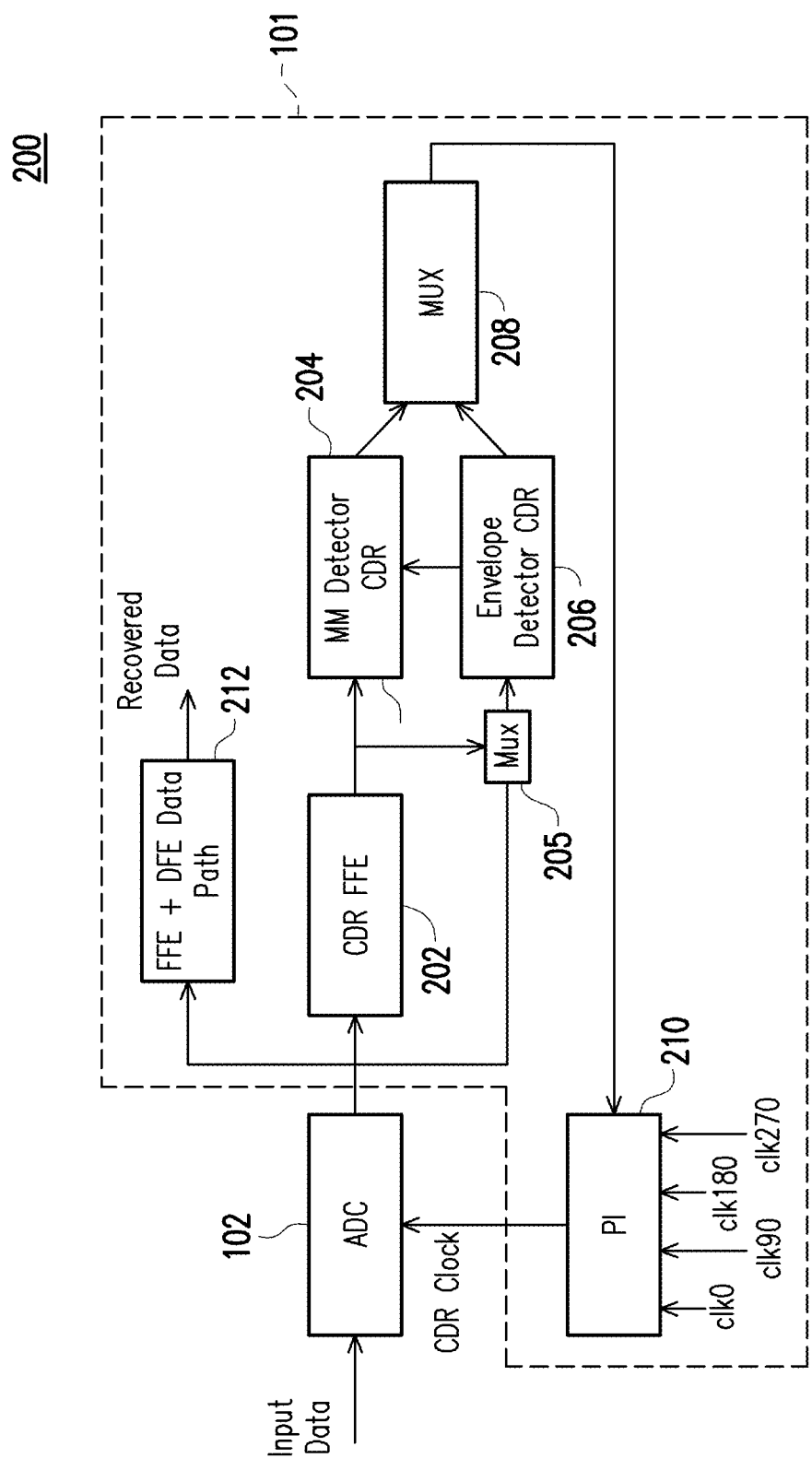
FIG. 2 schematically illustrates a block diagram of an ADC and a controller including a plurality of units according to an embodiment of the disclosure.

FIG. 2 illustrates a block diagram of an ADC and a controller including a plurality of units according to an embodiment of the disclosure. The block diagram 200 includes the ADC 102 and the controller 101. The controller 101 includes a plurality of modules. The ADC 102 is configured to convert the received data from analog data to digital data using a recovered data clock. The controller 101 is configured to generate the recovered data clock and a recovered data from the received data. The received data may suffer from the plurality of noises including the ISI. By generating the recovered data clock by the controller 101 correctly in term of frequency and phase, the ADC 102 samples the input data correctly. Thus, the recovered data can be recovered correctly and generates low BER.

Referring to FIG. 2, the controller 101 includes a clock and data recovery feed forward equalizer (CDR FFE) 202, a multiplexer (MUX) 205, a Mueller-Muller detector clock and data recovery (MM Detector CDR) 204, an envelope detector clock and data recovery (Envelope Detector CDR) 206, a multiplexer (MUX) 208, a phase interpolator (PI) 210, and a feed forward equalizer and decision feedback equalizer data path (FFE+DFE Data Path) 212. The CDR FFE 202 and the FFE+DFE Data Path 212 may be implemented by Finite Impulse Response (FIR) filter, Infinite Impulse Response (IIR) filter, or any kind of filter suitable for digital signal processing. The CDR FFE 202 and the FFE+DFE Data Path 212 may be applied for filtering the digital data having high ISI. The MM Detector CDR 204 and the Envelope Detector CDR 206 include digital signal processing circuits having capability to process the digital data to detect the estimated peak of the digital data. For the structure of the Envelope Detector CDR 206 will be elaborated later in compliance with FIG. 4. The MM Detector CDR 204 and the Envelope Detector CDR 206 generate the CDR code and another CDR code respectively to control the PI 210 for generating the clock. The PI 210 is included with the clock generator such as voltage oscillator or current oscillator.

In this embodiment, the CDR FFE 202 is coupled to the ADC 102 and the MUX 205 and configured to equalize the input data. For example, the input data includes the ISI, as such, the amplitude of the input data has been reduced or attenuated compared with the transmitted data or the frequency of the input data has been interfered by the noise frequency. Therefore, the CDR FFE 202 filters the input data from the ISI, as such, the input data is relatively the same with the transmitted data. By doing so, the MM Detector CDR 204 or the Envelope Detector CDR 206 via the MUX 205 estimates the peak of the data filtered by the CDR FFE 202 more accurately.

In the embodiment of FIG. 2, the MM Detector CDR 204 is coupled to the CDR FFE 202 and configured to detect an optimum phase of the input data. Specifically, the MM Detector CDR 204 estimates the input data peak by detecting a pre-cursor data sample and a post-cursor data sample having the same amplitude. The input data peak is then estimated by obtaining the middle data point between the pre-cursor data point and the post-cursor data point, as such, the interval between the pre-cursor data point to the middle data point is the same with the interval between the middle data point to the post-cursor data point. However, under the presence of ISI (without utilizing the CDR FFE 202), the impulse response of the input data may not symmetric. If the data peak is estimated by directly using the MM Detector CDR 204 without utilizing the CDR FFE 202, the estimated data peak may not be precisely located in the true data peak. The estimated data peak may be shifted to the right or to the left with respect to the true data peak. Hence the MM Detector needs to lock to a position where Pre-Cursor−Post-Cursor−OptOffset=0. Where the optimal offset (OptOffset) is calculated after the Envelop detector locks to the Envelop peak value.

Although the input data has been filtered to remove the ISI, the MM Detector CDR 204 may still has difficulty to estimate the true data peak correctly if the input data has high data rate (i.e., PAM-4). The reason is that the input data having high data rate has small data eye opening compared with the input data having low data rate. Therefore, the Envelope Detector CDR 206 is included to address this issue.

In this embodiment, the Envelope Detector CDR 206 is coupled to the MUX 205, the MUX 208, and the MM Detector CDR 204, and configured to generate an envelope data from the input data and detect an envelope data peak from the envelope data. The Envelope Detector CDR 206 may be applied for a plurality of number of data symbols and signed or unsigned data (i.e., 8-bit signed data). The Envelope Detector CDR 206 includes some signal processing modules generating the envelope data from the input data or generating the envelope data from the CDR FFE 202 via the MUX 205. The Envelope Detector CDR 206 calculates the 'Pre_Cursor–Post_Cursor' offset after detecting the envelope data peak and completing adaptation of the CDR FFE 202. When calculating 'Pre_Cursor–Post_Cursor' offset, the MUX 205 connects the CDR FFE output to the Envelope Detector CDR 206. After calculating the 'Pre_Cursor–Post_Cursor' offset, the Envelope Detector CDR 206 initializes the 'Pre_Cursor–Post_Cursor' offset to be used by the MM Detector CDR 204. The structure of the Envelope Detector CDR 206 is provided with respect to FIG. 4 which will be elaborated later.

The MUX 208 is coupled to the MM Detector CDR 204 and the Envelope Detector CDR 206. The MUX 208 is configured to pass the output of the MM Detector CDR 204 or the Envelope Detector CDR 206 which represent as CDR code or another CDR code. In other words, the MUX 208 is configured to select the Envelop Detector CDR output (another CDR code) during an initial Envelop detection. And then, after the Envelop Detector CDR 206 is locked to the optimum input data sampling phase, the MUX 208 is configured to select the MM Detector CDR output (CDR code). The CDR code/another CDR code is then used to generate a CDR clock according to frequency of the oscillator (i.e., 14 GHz) and a plurality of phases (i.e., clk0, clk90, clk180, clk270). The CDR clock represents the recovered data clock which is used by the ADC 102 to sample the input data from the analog data to the digital data. By generating the recovered data clock by the above-mentioned structure, the recovered data clock has an optimum sampling frequency and an optimum sampling phase. The optimum sampling frequency and the optimum sampling phase enable the ADC 102 to sample the input data to generate the digital data form with best possible SNR (signal to noise ratio) with respect to sampling phase. Therefore, the FFE+DFE Data Path 212 processes the digital data form to generate the recovered data having small BER.

Figure 3:
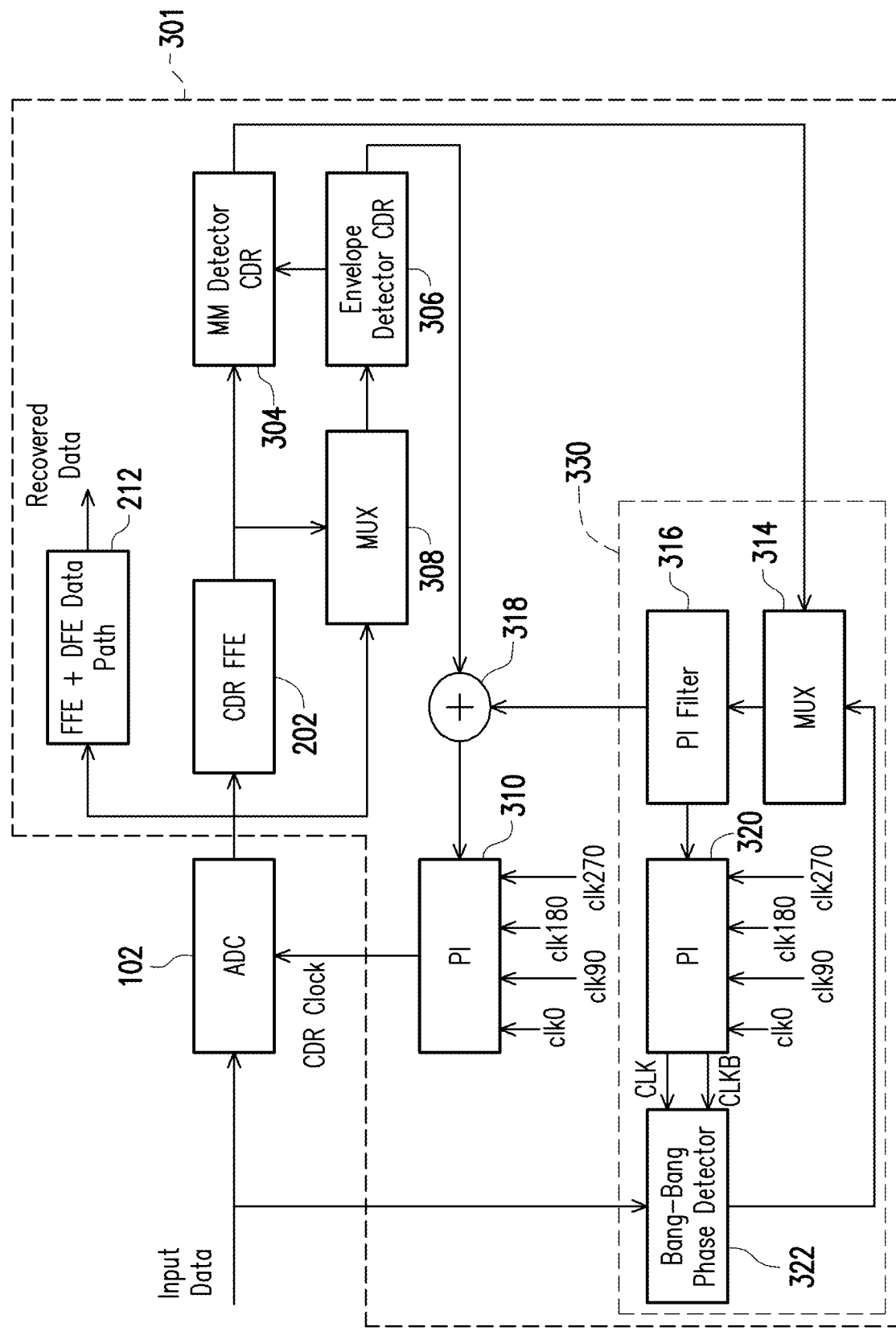
FIG. 3 schematically illustrates a block diagram of an ADC and a controller including a plurality of units according to another embodiment of the disclosure.

FIG. 3 illustrates a block diagram of an ADC and a controller including a plurality of units according to an embodiment of the disclosure. One of the differences between the controller 101 of FIG. 2 and the controller 301 of FIG. 3 is the arrangement of the plurality of units. The function of the plurality of units in FIG. 3 is the same as the function of the plurality of units in FIG. 2. For example, the MM Detector CDR 304, the Envelope Detector CDR 306, the MUX 308, and the PI 310 have the same functions as the MM Detector CDR 204, the Envelope Detector CDR 206, the MUX 205, and the PI 210 respectively. Moreover, with respect to the controller 101 of FIG. 2, the controller 301 of FIG. 3 has additional units including an Adder 318 and a unit 330. The unit 330 is Bang-Bang Phase Detector CDR. The unit 330 may be implemented as a phase detector including an embedded oscillator to detect a phase difference between the input data and the embedded oscillator controlled according to the CDR code generated by the MM Detector CDR 304.

Specifically, the arrangement of the plurality of units of the controller 301 is described as follows. The CDR FFE 202 is coupled to the ADC 102 and configured to equalize the input data as an equalized data. The MM Detector CDR 304 is coupled to the CDR FFE 202 and configured to detect an input data peak from the input data. The MUX 308 is coupled to the CDR FFE 202 and the ADC 102. The Envelope detector CDR 306 is coupled to the MUX 308, the MM Detector CDR 304, and the Adder 318, and configured to generate an envelope data from the input data or the equalized data from the CDR FFE 202 via the MUX 308. The Envelope Detector CDR 306, then, detects an envelope data peak from the input data or the equalized data. The Envelope Detector CDR 306 calculates the 'Pre_Cursor–Post_Cursor' offset after detecting the envelope data peak and completing adaptation of the CDR FFE 202. When calculating 'Pre_Cursor–Post_Cursor' offset, the MUX 308 connects the CDR FFE output to the Envelope Detector CDR 306. After calculating the 'Pre_Cursor–Post_Cursor' offset, the Envelope Detector CDR 306 initializes the 'Pre_Cursor–Post_Cursor' offset to be used by the MM Detector CDR 304. The adder 318 is coupled to the Envelope Detector CDR 306 and the unit 330. The PI 310 is coupled to the adder 318 and the ADC 102 and configured to generate the recovered data clock. The FFE+DFE Data Path 212 is coupled to the ADC 102 and configured to generate the recovered data. The unit 330 is coupled to the ADC 102 and the adder 318 and configured to generate a data phase code. The data phase code generated by the unit 330 and the another CDR code generated by the Envelope Detector CDR 306 are added by the adder 318 to generate a combination code. The combination code is then used for the PI 310 to generate the CDR clock having the optimum sampling frequency and the optimum sampling phase. The CDR clock is assigned as the recovered data clock which is used for the ADC 102 to sample the input data precisely and generate the digital data form. The digital data form is then further equalized by the FFE+DFE Data Path 212 to generate the recovered data having small BER.

In this embodiment, the unit 330 is used to track the finite Parts per Million (PPM) difference in the far end transmitter clock frequency and the local oscillator frequency. This Bang-Bang Phase Detector CDR is added because, Envelop detector CDR is a very low bandwidth system and during the Envelop detection based phase recovery if there is finite PPM difference between the local oscillator clock and the far end transmitter clock, the envelop detection mechanism fails as it needs to sample continuously at a static offset phase of the incoming data phase to accurately calculate the envelope value. Hence it needs to the local clock frequency to match the incoming data frequency.

Specifically, the unit 330 includes Bang-Bang Phase Detector 322, a MUX 314, a PI Filter 316, and a PI 320. The Bang-Bang Phase Detector 322 is coupled to the ADC 102 and configured to match an input data phase and an intermediate data clock. The MUX 314 is coupled to the Bang-Bang Phase Detector 322 and the MM Detector CDR 304. The PI Filter 316 is coupled to the MUX 314 and configured to generate an equalized data. The PI 320 is coupled to the PI Filter 316 and the Bang-Bang Phase Detector 322 and configured to generate the intermediate data clock.

According to this embodiment, the PI Filter 316 may be FIR filter, IIR filter, or any filter suitable for signal processing. The function of the PI 320 is similar with the PI 310.

The difference of PI 320 with respect to the PI 310 is that the PI 320 generates two intermediate clocks (CLK and CLKB) for the Bang-Bang Phase Detector while PI 310 generates CDR Clock for ADC. The CLKB is a complementary of the CLK. For example, if the CLK has a rising edge, the CLKB has the falling edge at the same time. The Bang-Bang Phase Detector 322 may be implemented as a non-return-to-zero (NRZ) Bang-Bang Phase Detector, hence it needs very less area. The Bang-Bang Phase Detector 322 may be implemented as another phase detector that known by person skilled in the art. The Bang-Bang Phase Detector 322 compares the data sampled with CLK and CLKB to generate the phase difference. The phase difference is then feed forward to the adder 318 via PI Filter 316 to generate the CDR code having correction of the phase. This corrected CDR code is then used by the PI 310 to generate the CDR clock having optimal frequency and phase. That is, by including the unit 330 into the controller 301, the controller 301 generates the recovered data clock having optimal frequency and phase, as such, the recovered data having small BER can be generated.

Figure 4:
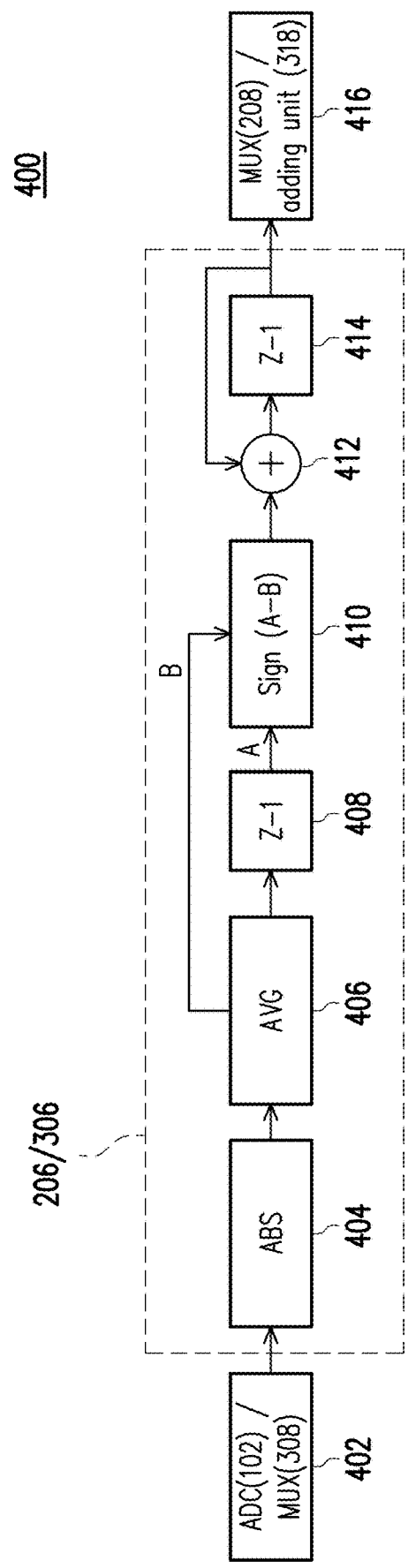
FIG. 4 schematically illustrates a block diagram of an ADC and an Envelope Detector CDR including a plurality of modules according to an embodiment of the disclosure.

FIG. 4 illustrates a block diagram of the ADC and the Envelope Detector CDR including a plurality of modules according to an embodiment of the disclosure. The Envelope Detector CDR 206 includes an absolute module (ABS) 404, an average module (AVG) 406, a first delay module 408, a sign module (Sign) 410, an adder 412, and a second delay module 414.

Figure 5:
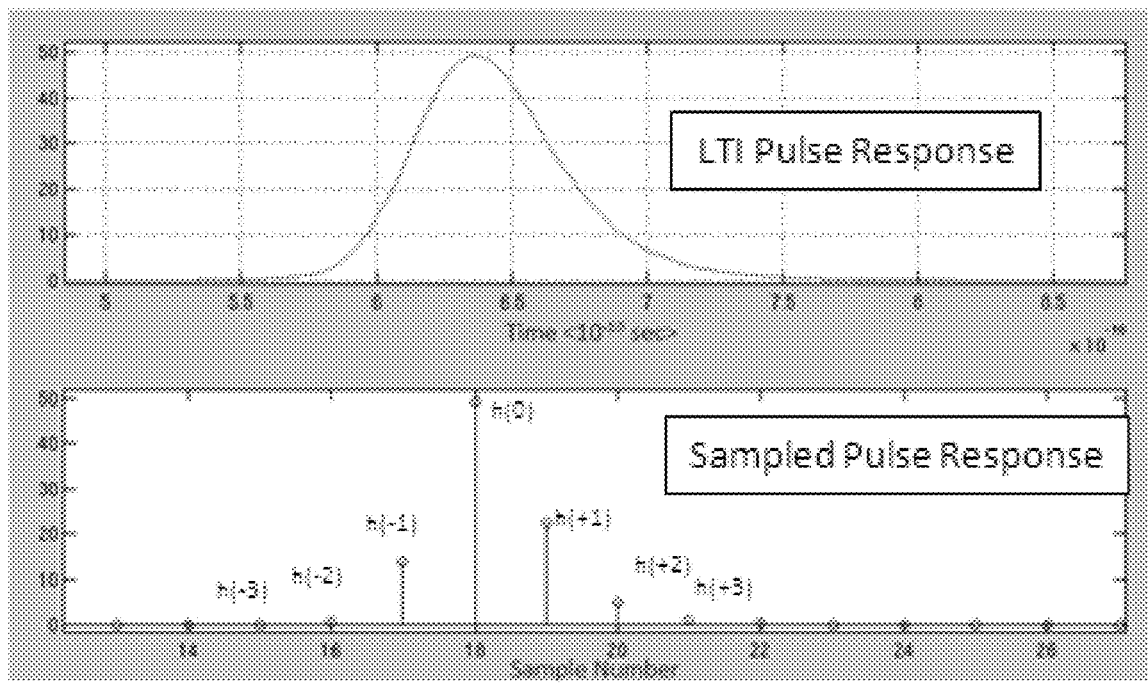
FIG. 5 schematically illustrates a chart of pulse response generated by the combination of CN and the CTLE according to an embodiment of the disclosure.
Figure 6:
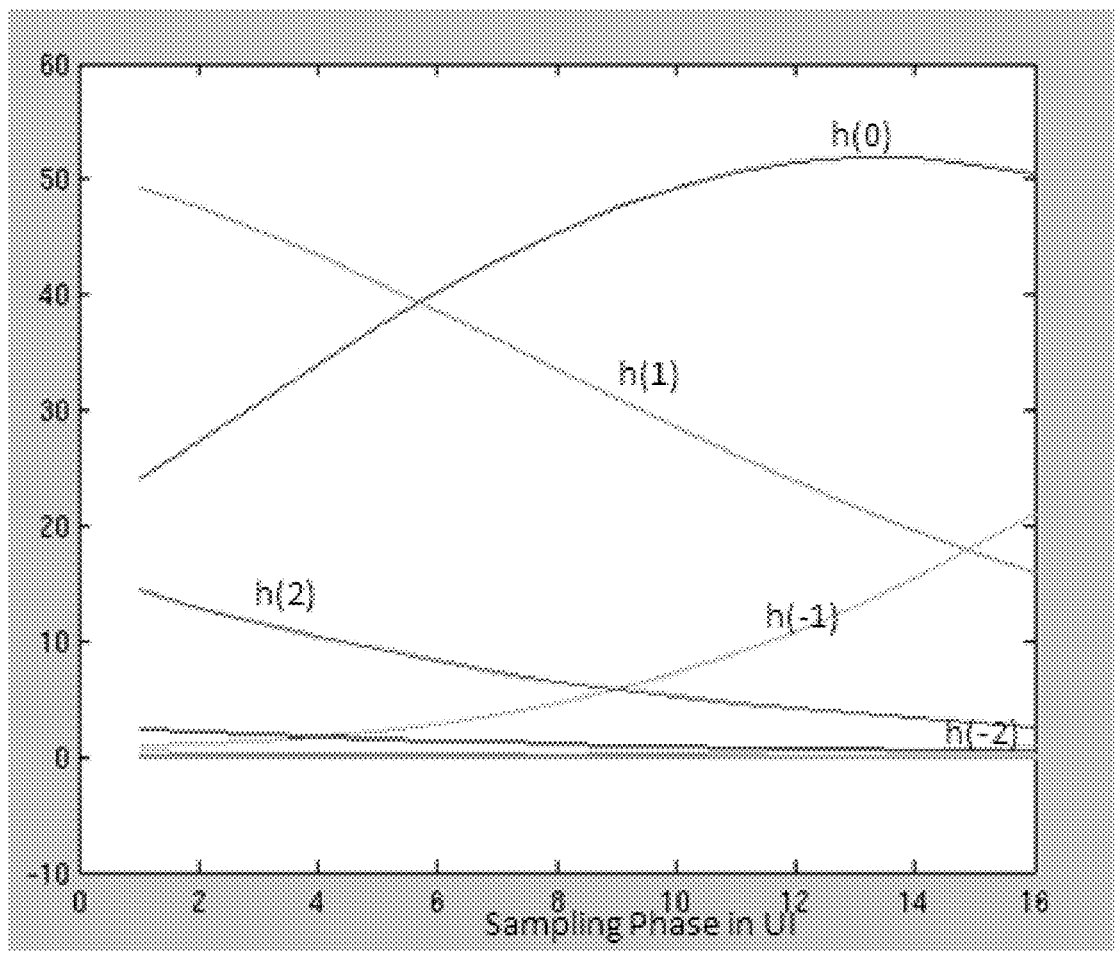
FIG. 6 schematically illustrates plot of signal component and ISI components with respect to sampling phase across UI according to an embodiment of the disclosure.

Referring to FIG. 2 and FIG. 4, the ABS 404 is coupled to the ADC 102. The ABS 404 is coupled to the MUX 308 according to FIG. 3 and FIG. 4. The ABS 404 is configured to generate absolute data from signed data. For example, the ADC 102 samples the input data to generate the digital data form having 8-bit signed data. The output of ABS 404 is fed to the input of AVG 406. The AVG 406 is configured to calculate average data B from the absolute data. For example, the average data may a digital data having 24-bit data when the input 7-bit data is accumulated for 2^UI. The first delay module 408 is coupled to the AVG 406 and configured to generate first delay data A. The first delay data A maybe a data sample of the average data having t−1 sample time (Sample Time ~2^17UI) with respect to the data B. For example, if the current data at t sample time represents the data B, then the data A represents the previous data of the data B at 1 sample time earlier than the sample time of the data B. And then, the data A and the data B is feed forward to the Sign 410 which is coupled to the AVG 406 and the first delay module 408. The Sign 410 is configured to check whether the data B is increased or decreased with respect to the data A. If the data B is greater than the data A, then the average data is increased. In contrast, if the data B is less than the data A, then the average data is decreased. The increasing of the average data represents that an output of the Sign 410 is negative sign, and the decreasing of the average data represents that the output of the SIGN 410 is positive sign. By determining whether the sign is positive or negative, a direction of the average data can be obtained. And then, the positive sign or the negative sign is then inputted to the adder 412 and the second delay module 414 which is coupled to the Sign 410. The adder 412 and the second delay module 414 together form an accumulator which evaluates the phase offset. The discrete time representation of the input signal at the ADC can be represented as sum of product of samples of transmitter output and impulse response of the combined system of Channel+ Receiver's Analog Front End which includes VGA and CTLE, as shown in Equation 1. The impulse response generated by the CN and the CTLE is shown in FIG. 5. The first term 'yin(0)*h(0)' is the ideal output without any ISI. However, because of the channel ISI, the second part of the equation corrupts the output. Hence each ADC input sample is a sum of the signal component and an ISI component. In FIG. 6, the signal component (cursor) and ISI components are depicted with respect to sampling phase. The receiver CDR needs to find and track the phase location where the y_sig value is maximum. Envelop detector tries to estimate the y_sig component with respect to sampling phase along the UI. Envelop detector takes the ADC output, converts it to an absolute value as shown in equation 3.

In equation 1, y_in(0) represents the transmitter output, which in general is a random sequence, where each symbol has an equal probability of being positive or negative (50% each). In equation 2, the output sample y_out is represented as a sum of signal and ISI components. The y_out is corrupted by large y_isi, majority of times the value of y_isi is less than y_sig as the probability of all contributing samples of ISI being same polarity is very less hence majority of times y_out will match the sign of y_in. Hence, when successive samples of y_out are added, since the absolute value is added, the term y_sig gets accumulated as it is always converted to positive sign, while the term y_isi gets averaged out, as consecutive samples will have the y_isi component of random polarity and zero mean distribution. So if the term y_abs is accumulated for a large number of samples (e.g. 2^17 samples), the y_isi effectively gets cancelled to a small value (ideally 0, if for all samples yout sign is always same as y_sig), this results in yabs_avg begin proportional to y_sig. The CDR needs to obtain a phase information for which the cursor value is maximum in the UI.

$$y\_out(0) = y\_in(0) * h(0) + \sum_{k=m}^{n} y\_in(x)h(x) \text{ where } k \neq 0 \qquad \text{Equation 1}$$

$$y\_out = y\_sig + y\_isi \qquad \text{Equation 2}$$

$$y_{adc} = \text{Digitized}(y\_out) \qquad \text{Equation 3}$$

$$y_{abs} = y_{adc} * \text{sign}(y_{adc}) \qquad \text{Equation 4}$$

$$y_{acc} = \sum_{k=0}^{N} \{y_{sig}(k) + y_{isi}(k)\} \qquad \text{Equation 5}$$

$$y_{acc} = \sum_{k=0}^{N} y_{sig}(k) + \sum_{k=0}^{N} y_{isi}(k) \qquad \text{Equation 6}$$

$$y_{acc} = y_{sig\_acc} + y_{isi\_acc} \qquad \text{Equation 7}$$

In another embodiment, the AVG 406 is configured to calculate one data sample of the average data by averaging the absolute data within 4.7 μs (e.g. 2^17 UI). The one data sample of the average data represents the one data sample of the envelope data. For example, the ADC 102 samples the input data to generate the digital data by using a sample rate having interval of 1 unit interval (UI). Within the interval 4.7 μs, the digital data has a plurality of data samples. All of the data samples within the range of interval 4.7 μs is then processed by the ABS 404 to generate the absolute data. The absolute data has a positive sign of data and is generated similar to Equation 4. By averaging the absolute data, the noise of the input data can be reduced. Moreover, the input data which is sampled at high frequency (i.e., 56 Gbps or 28 GSps) has unrecognizable eye opening of the input data on eye data diagram. Therefore, a conventional MM detector cannot perform the detection of the data peak correctly. In contrast, by averaging the absolute data to generate the average data or the envelope data, because the process of averaging the Absolute values uses the statistical property of the random data sequence to have a zero mean value, which causes the ISI components to average out to zero while the process of taking the Absolute value of sample makes the main cursor (y_sig component) polarity to be always positive, hence the signal component gets accumulated over time of averaging. Since the accumulation is done for 2^17 samples with each sample of 7-bit resolution, the envelope data is of 24-bits resolution, as such, a detection for the envelope data peak can be performed accurately. The Envelop detector gives an output for every N-UI (e.g. 2^17 UI), the current Envelop detector output is compared to the previous one and the input data sampling phase is updated to move the phase in a direction of increase in Envelop, This will continue till the peak of Envelop is reached, after which any update in input data sampling phase will cause the next Envelop detector output value to be lower. Once the Envelop detector has reached the peak, the input data sampling phase is frozen and the CDR-FFE equalizer is enabled and trained, after which the MM-CDR is enabled.

In another embodiment, the change in the Envelop value with the sampling phase is calculated as increment or decrement using delay block 408 and Sign of Difference block 410. The delay block 408 holds the previous Envelop value that was calculated by accumulating for N-UI samples (e.g. N=2^17).

In another embodiment, the ADC 102 samples the input data at 1× rate of the recovered data clock. In other words, the sample rate of the ADC 102 is the same with the frequency of the recovered data clock. By having the sample rate of the ADC 102 is the same with the frequency of the recovered data clock, the ADC 102 does not need to have high resolution characteristic and an overhead of the communication data system can be avoided. Although the ADC 102 only has the frequency running at 1× rate of the recovered data clock, the data communication system 100 is able to generate the recovered data clock at optimal frequency and phase because the data communication system 100 is equipped with the Envelope Detector CDR 206 or 306. The Envelope Detector 206 or 306 maximizes the input data and reduces the presence of ISI as well as detects the optimal peak of the input data. Therefore, the optimal recovered data clock and the recovered data can be generated. That is, by including the Envelope Detector CDR 206 or 306 in the corresponding data communication system 100, specifically, by using the structure of the controller 200 or 300, the optimal recovered data clock and the recovered data can be achieved, as such, the small BER of the received data can be obtained.

In another embodiment, the Envelope Detector CDR 206 or 306 determines an optimal offset for the MM Detector CDR 204 or 304. The optimal offset is used for the MM Detector CDR 204 or 304 to recover the optimum peak detected by the Envelope Detector CDR 206 or 306. As we described earlier that conventional MM detector detects the data peak according to the pre-cursor and the post-cursor having the same amplitude as described in equation 8. However, since the data eye of the received data or the input data is not always symmetrical because of the presence of asymmetric ISI, the data phase detected by the conventional MM detector (an intermediate peak) is not at the optimal peak and will cause a poor Signal to Noise ratio. Therefore, the optimal offset (OptOffset) for shifting the intermediate peak to the true data peak is needed as shown in equation 9. The Envelope Detector CDR 206 or 306 detects the Envelope data peak and calculates the corresponding 'Pre_Cursor–Post_Cursor' value which is the optimal offset for the MM Detector CDR. The MM Detector CDR 204 or 304 then uses this optimal offset to lock to this optimum input data sampling phase and track it continuously. Therefore, by determining the optimal offset, the MM Detector CDR 204 or 304 can detect the true data peak correctly. That is, the Envelope Detector CDR 206 or 306 improves the performance of the MM Detector CDR 204 or 304 by providing the optimal offset to the MM Detector CDR 204 or 304.

$$\text{Timing Err}=\text{Pre\_Cursor}-\text{Post\_Cursor} \quad \text{Equation 8}$$

$$\text{Timing Err}=\text{Pre\_Cursor}-\text{Post\_Cursor}-\text{OptOffset} \quad \text{Equation 9}$$

Figure 7:
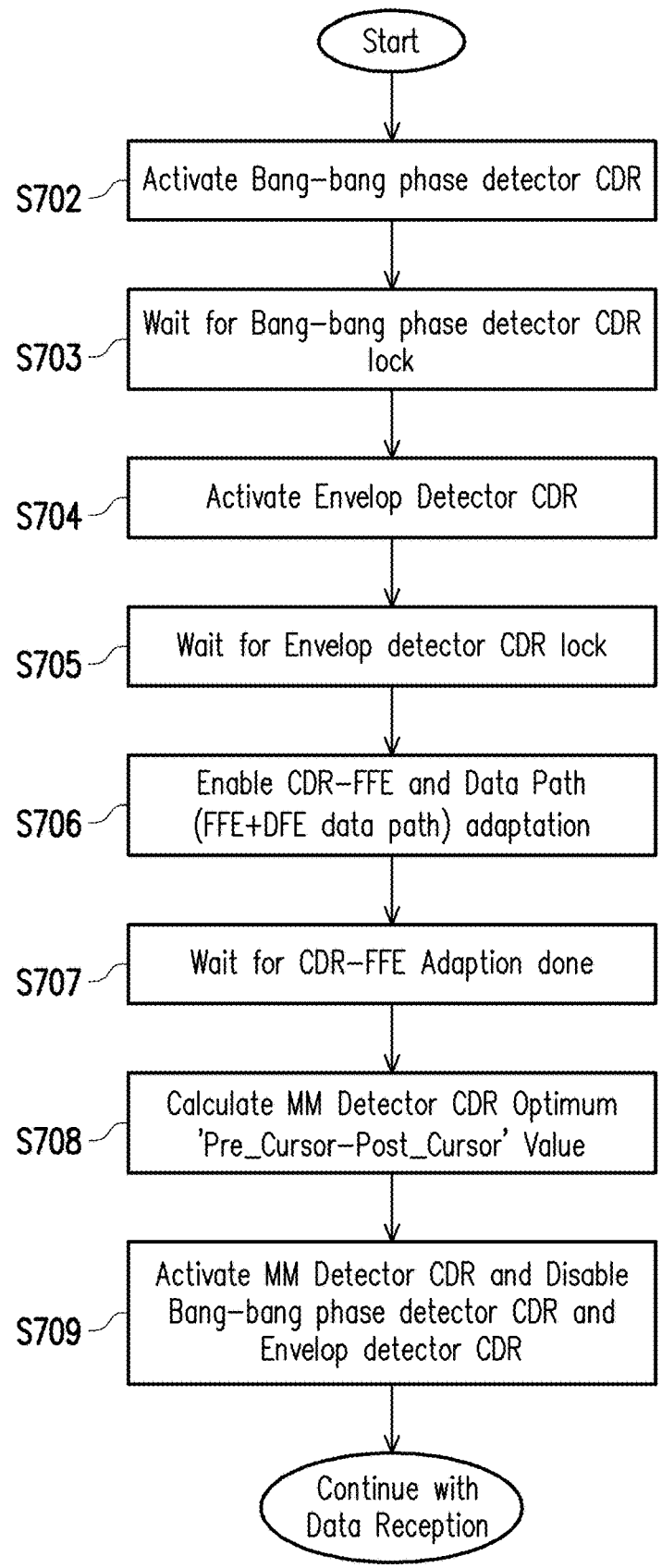
FIG. 7 schematically illustrates a sequence of activation of the controller according to an embodiment of the disclosure.

FIG. 7 illustrates a sequence of activation of the controller according to an embodiment of the disclosure. Since the controller 101 or 301 includes the plurality of units, in order to generate the recovered data clock and the recovered data, the plurality of units need to be activated in a specific sequence.

Referring to FIG. 3 and FIG. 7, for example, the sequence of the activation of the controller 301 is started in step S702 by activating the Bang-Bang Phase Detector 322. The Bang-Bang Phase Detector 322 processes the input data. It samples the input PAM4 data as a regular PAM2 (NRZ) data with both the CLK and CLKB phases generated by the PI 320. Based on the samples it generates increment/decrement signals which are routed to PI Filter which generates the data phase code, once this Bang-Bang Phase detector CDR is locked (step S703), the sequence is continued to step S704 by activating the Envelope Detector CDR 306. Since the MM Detector CDR is still not activated, the output of the ADC 102 is inputted to the Envelope Detector CDR 306 via the MUX 308. The Envelope Detector CDR 306 generates the envelope data and detects the envelope data peak which represents the recovered data clock. The sequence for activating the Envelope Detector CDR 306 first before activating the MM Detector CDR 304 is crucial because the input data may contain the high presence of ISI. Since the MM Detector CDR 304 does not have the optimal offset, the data peak detected by the MM Detector CDR 304 may not represents the true data peak if the MM Detector 304 is activated earlier than the Envelope Detector CDR 306. When the Envelope detector CDR is locked (step S705), the sequence is continued to step S706 by activating the CDR FFE 202 and the FFE+DFE Data Path 212. By activating the CDR FFE 202 and the FFE+DFE Data Path 212 and the adaptation of the CDR FFE 202 and the FFE+DFE Data Path 212 have been done (step S707), the recovered data clock and the recovered data is ready to be generated. The recovered data clock represents the data clock having the optimum frequency and phase, as such the recovered data having the small BER can be generated. Since the Envelope Detector CDR 306 has been activated and detects the envelope data peak, the sequence is continued to step S708 by calculating the MM Detector CDR Optimum 'Pre_Cursor–Post_Cursor' value. And then, the process of activating the MM Detector CDR 304 and disabling the Bang-Bang Phase Detector 322 and Envelope Detector CDR is performed in step S709. The MM Detector CDR 304 calculates the offset according the envelope data peak detected by the Envelope Detector CDR 306. That is, by activating the plurality of units of, for example, the controller 301 according the sequence shown by FIG. 7, the recovered data clock having the optimum frequency and phase and the recovered data having the small BER can be generated.

Figure 8:
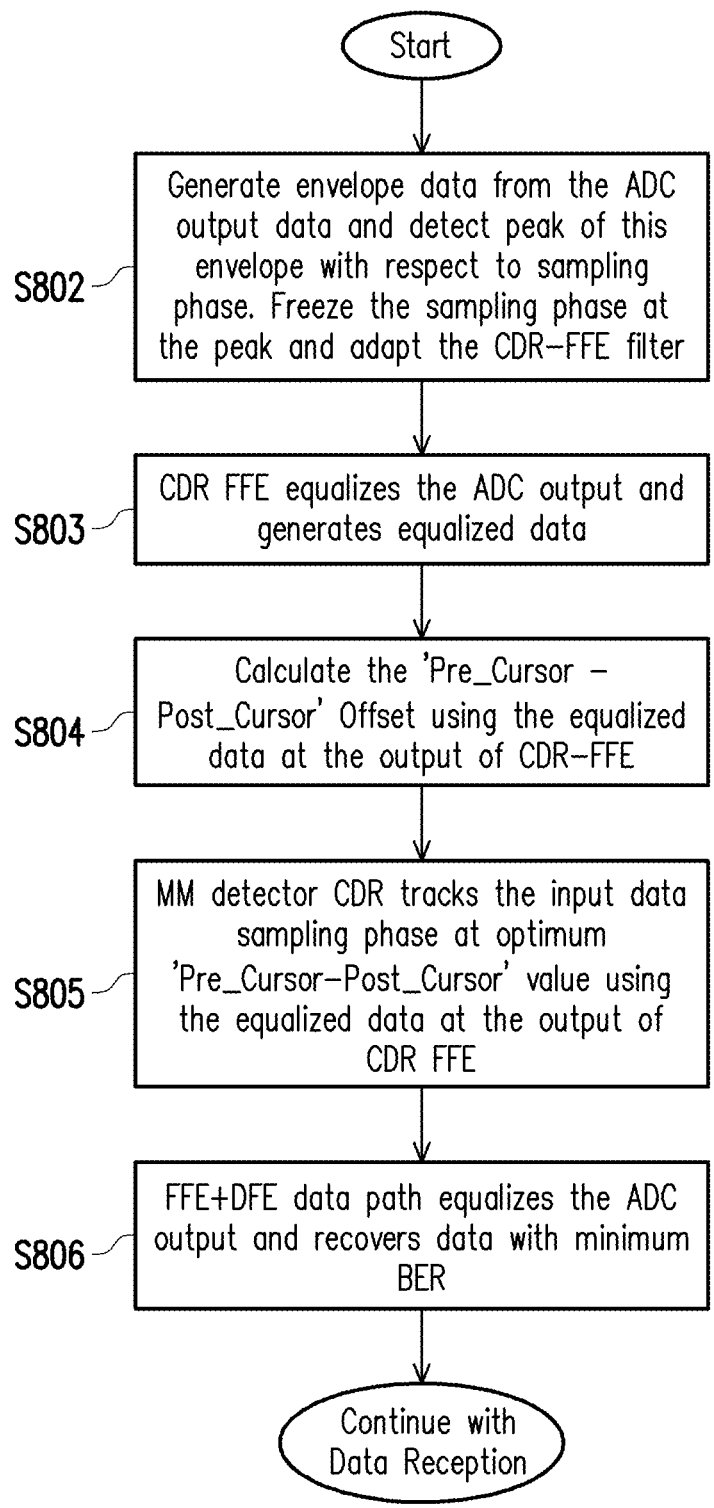
FIG. 8 schematically illustrates a method of the apparatus for data communication according to an embodiment of the disclosure.

FIG. 8 illustrates a method of the apparatus for data communication according to an embodiment of the disclosure. The Controller includes steps S802 to S806. Since the CDR FFE implements the filtering process to the ADC output data and generates equalized data which has better signal to noise ratio than the input data. In step S802, the peak of envelop is detected from the input data by the Envelop detector CDR. In step S803 the CDR FFE equalizes the ADC output data and generates equalized data. After the CDR FFE filter adaptation has finished, in step S804 the logic in Envelop detector CDR estimates the 'Pre_Cursor–Post_Cursor' value that is used by the MM detector CDR for detecting the optimum input data sampling phase. After step S804 is completed, in step S805 the MM Detector CDR is enabled and it starts tracking the input data sampling phase, with the condition that "Pre_Cursor–Post_Cursor" value is equal to the value calculated in step S804. In Step S806 the FFE+DFE data path equalizer generates the equalized data from the ADC output data which has best possible signal to noise ratio and hence low BER.

In addition, in order to clearly describe step-by-step of activation of the plurality of modules in the controller 301, FIGS. 9A-9E are provided. FIGS. 9A-9E schematically illustrate each step of activation of each module in the controller 301 given in FIG. 3.

Figure 9A:
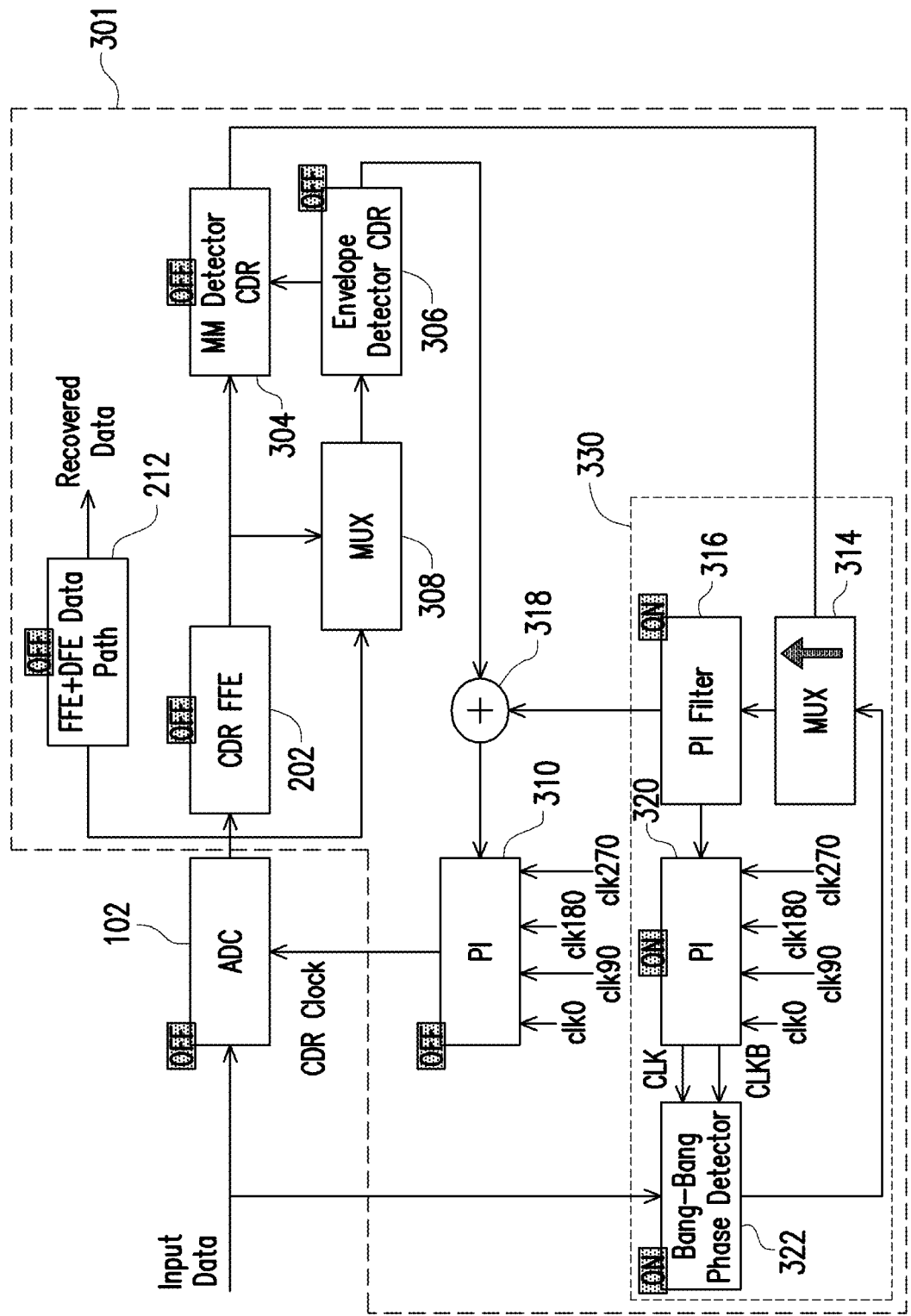
FIG. 9A-9E schematically illustrate each step of activation of the plurality of modules in the controller according to an embodiment of the disclosure.

Referring to FIG. 9A, in step 1, the Bang-Bang Phase Detector CDR 330 is enabled/activated to acquire the frequency lock. As mentioned earlier that the Bang-Bang Phase Detector CDR 330 includes the Bang-Bang Phase Detector 322, the MUX 314, the PI Filter 316, and the PI 320. The activation of each module in the Bang-Bang Phase Detector CDR 330 is shown as annotation "ON". On the other hand, the annotation "OFF" represents that the module is not yet activated (i.e., the PI 310 is not yet activated). The Bang-Bang Phase Detector 322, the MUX 314, the PI Filter 316, and the PI 320 form the Bang-Bang Detector CDR loop. Since the MM Detector CDR is not yet activated in this step, the MUX 314 pass the signal from the Bang-Bang Phase Detector 322 to the PI Filter 316. The Bang-Bang Phase Detector CDR loop treats the incoming PAM4 data as a simple PAM2 signal and locks to the zero-crossing edges acquiring the frequency lock. Once the Bang-Bang Phase Detector CDR 330 has been locked, the Bang-Bang Phase Detector CDR 330 is ready to acquire the frequency lock, as such, the controller 301 performs the next step (step 2).

Figure 9B:
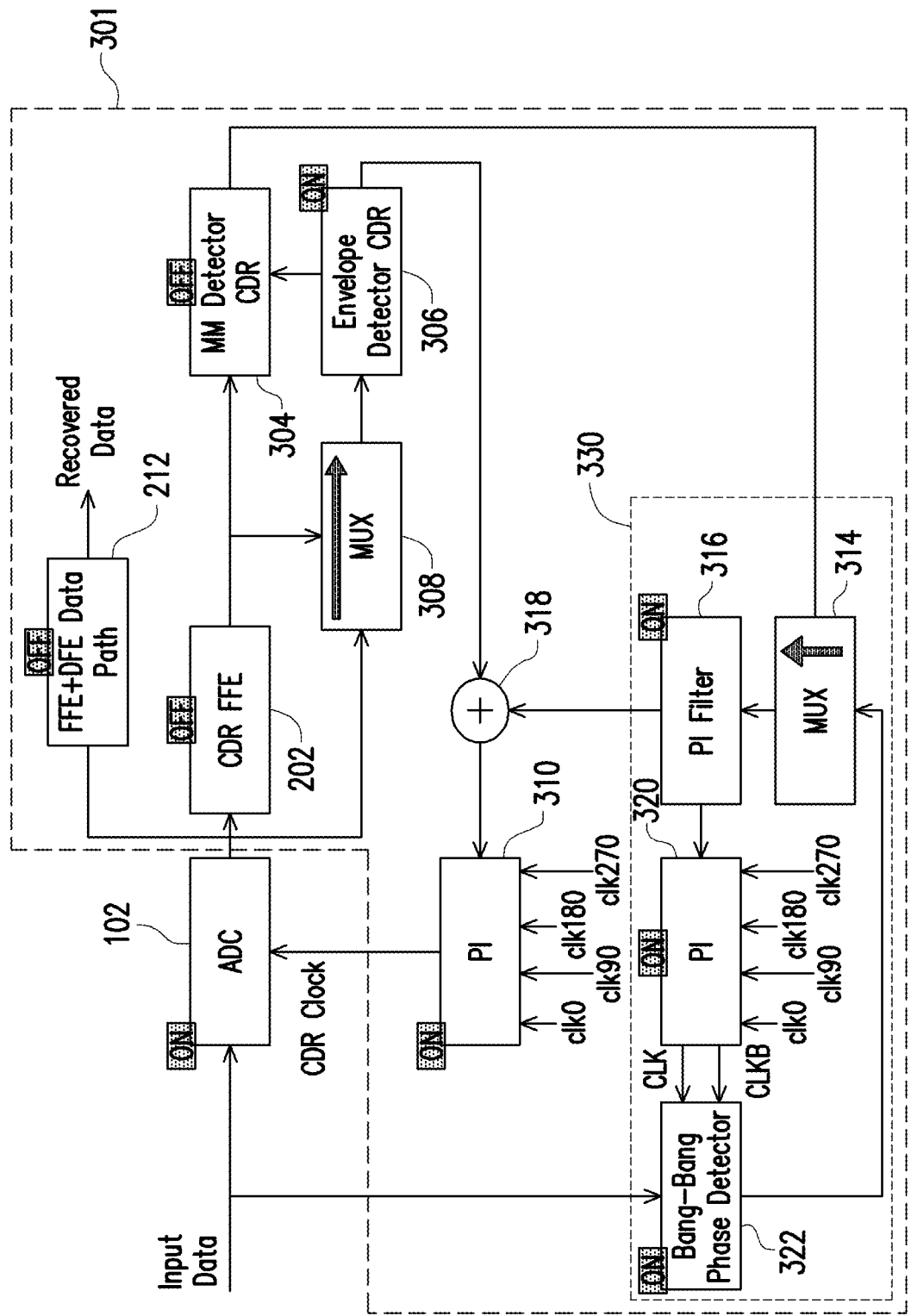

Referring to FIG. 9B, in step 2, the Bang-Bang Phase Detector CDR 330 acquires the frequency lock while the Bang-Bang Phase Detector CDR 330 tracks the zero crossing edges of the incoming data signal (input data). Therefore, in this step, the ADC 102, the CDR FFE 202, the Envelope Detector CDR 306, and the PI 310 are activated. The MUX 308 pass the input data to the Envelope Detector CDR 306. And then, the Envelope Detector CDR 306 calculates the envelope to obtain the optimum Envelope Detector CDR code (another CDR code) and passes this code to the PI 310 to generate the CDR clock via the adder 318. The adder 318 receives the signal from the Envelope Detector CDR 306 and the Bang-Bang Phase Detector CDR 330. The Envelope Detector CDR 306 sweeps the phase offset while finding the envelop value for each phase offset, and finds the envelop data peak. Once the Envelope Detector CDR 306 finds the envelop data peak, the controller performs step 3.

Figure 9C:
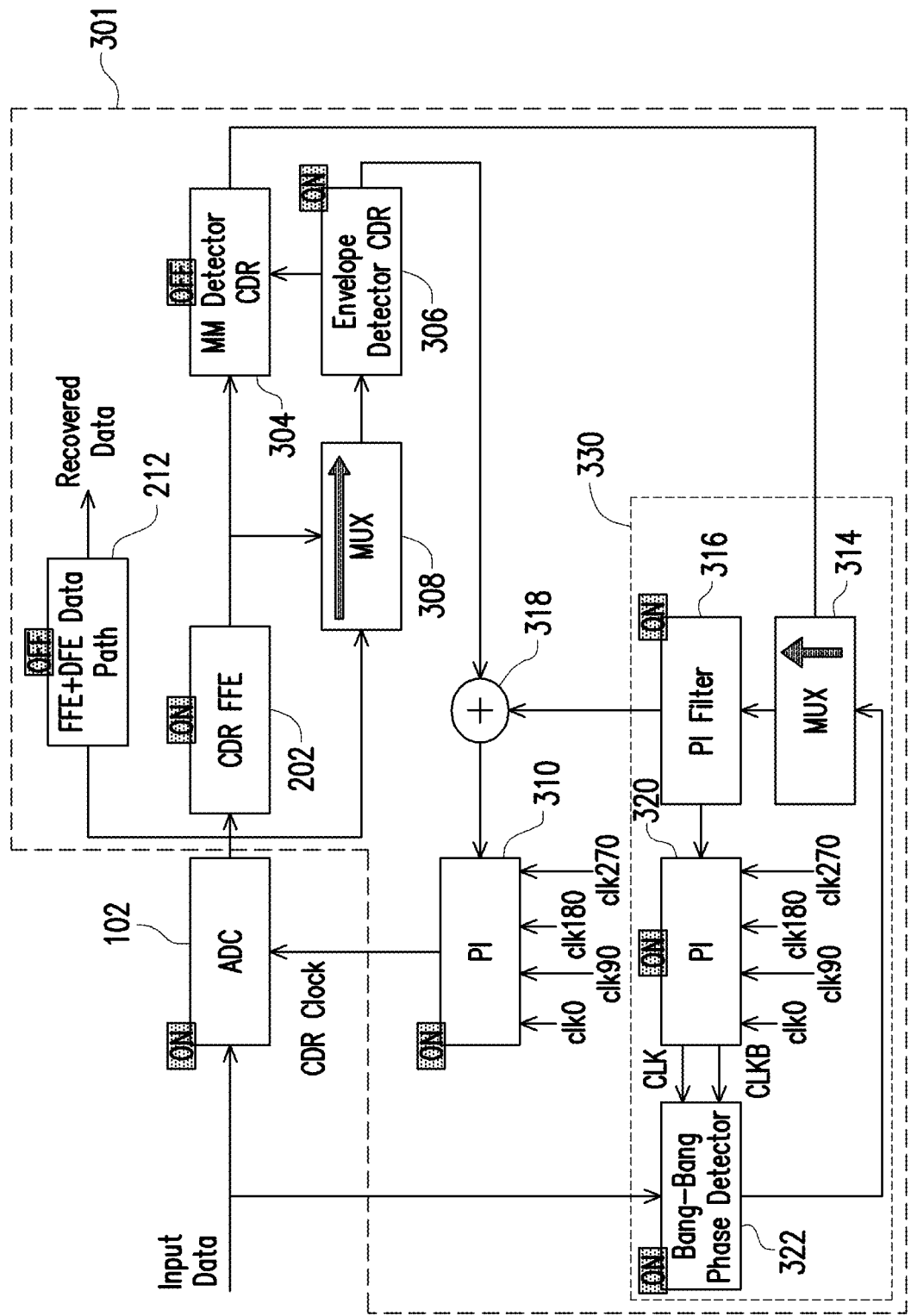

Referring to FIG. 9C, in step 3, the CDR FFE adaptation is performed. After the optimum Envelope Detector CDR code is detected in step 2, the CDR FFE 202 is activated and the CDR FFE adaptation is enabled. Once the CDR FFE adaptation is completed, the controller 301 performs step 4.

Figure 9D:
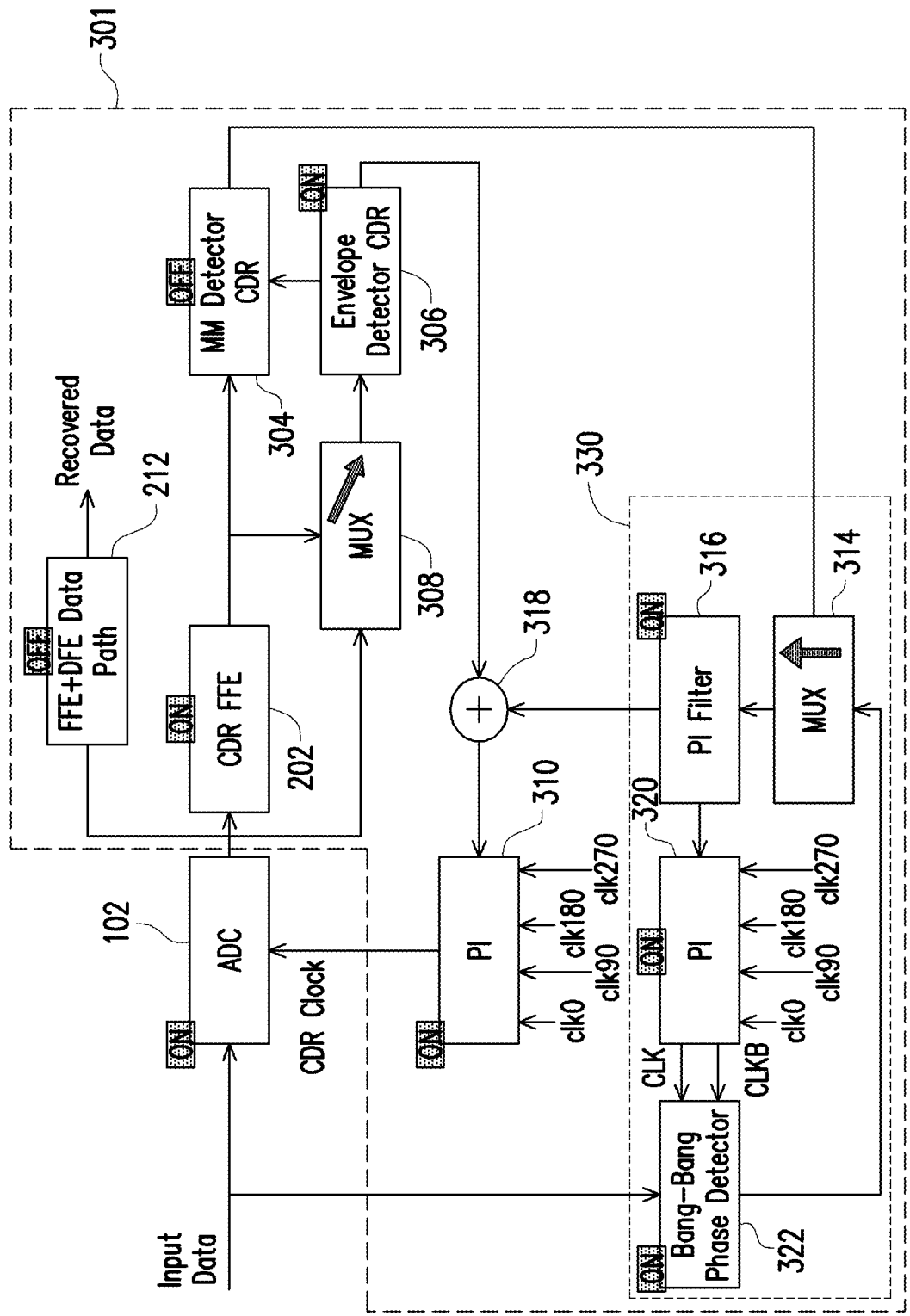

Referring to FIG. 9D, in step 4, the 'Pre_Cursor–Post_Cursor' offset is calculated using a logic in the Envelope Detector CDR 306. In this step, the CDR FFE output is connected to the Envelope Detector CDR 306 using the MUX 308. Once the 'Pre_Cursor–Post_Cursor' offset is calculated, the controller 301 performs step 5.

Figure 9E:
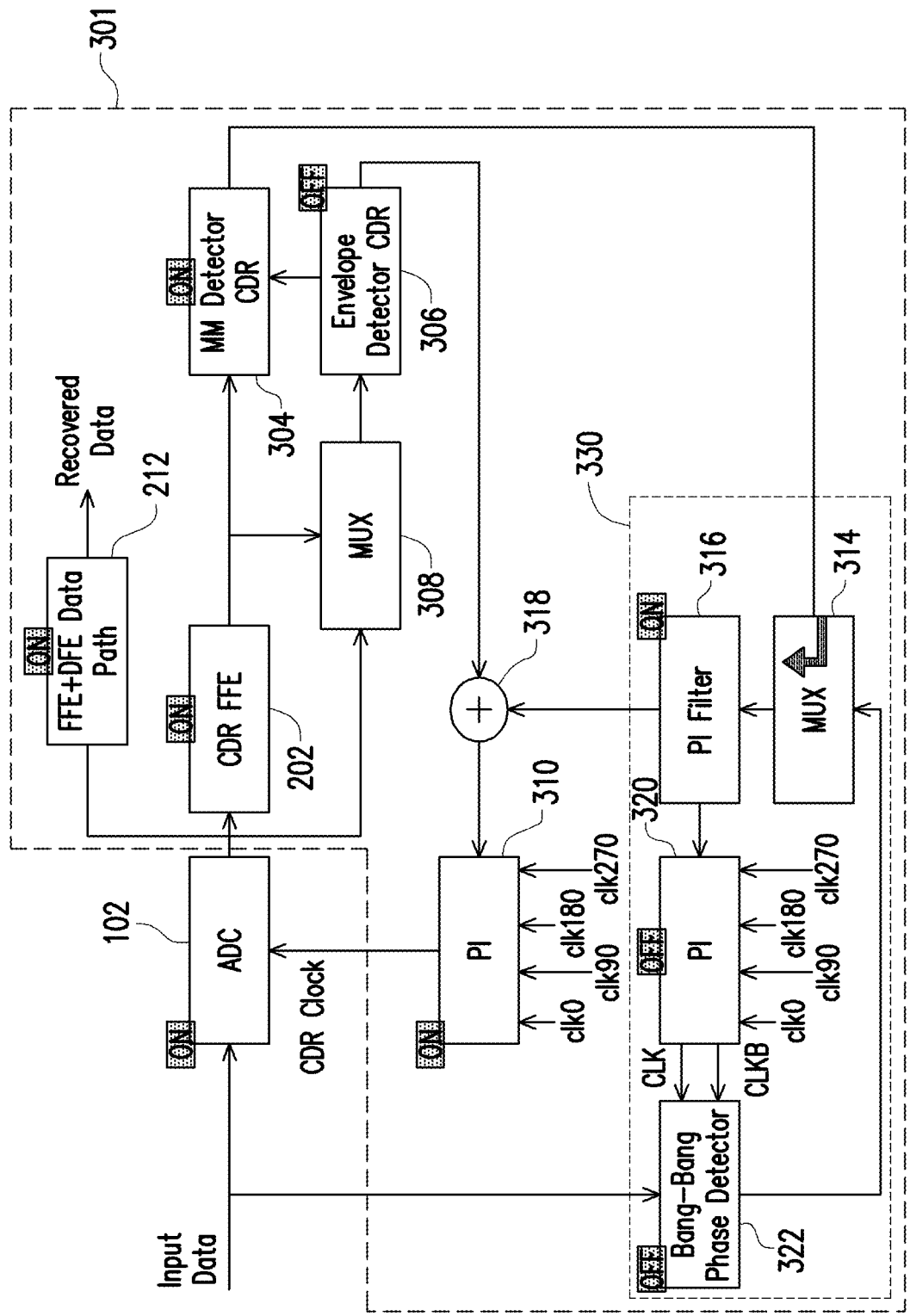

Referring to FIG. 9E, in step 5, the MM Detector CDR 304 and the FFE+DFE data path are activated. Accordingly, the Bang-Bang Phase Detector 322, the PI 320, and the Envelope Detector CDR 306 are deactivated (disabled). Since, the CDR FFE 202 has been adapted, the MM Detector CDR receives the signal from the CDR FFE 202. Accordingly, since the Bang-Bang Phase Detector 322 and the PI 320 have been deactivated, the MUX 314 passes the CDR code from the MM Detector CDR 304 to the adder 318 via the PI Filter 316. The MM Detector CDR 304 uses the 'Pre_Cursor–Post_Cursor' offset calculated by the Envelope Detector CDR 306 in the previous step. The MM Detector CDR 306 tracks the optimum sampling phase and generates the CDR clock via the PI 310. The ADC 102 uses the optimized CDR clock to sample the input data. Finally, the ADC 102 passes the sampled input data to the FFE+DFE data path 212 to generate the recovered data. By doing so, the recovered data having the small BER can be generated.

Figure 10:
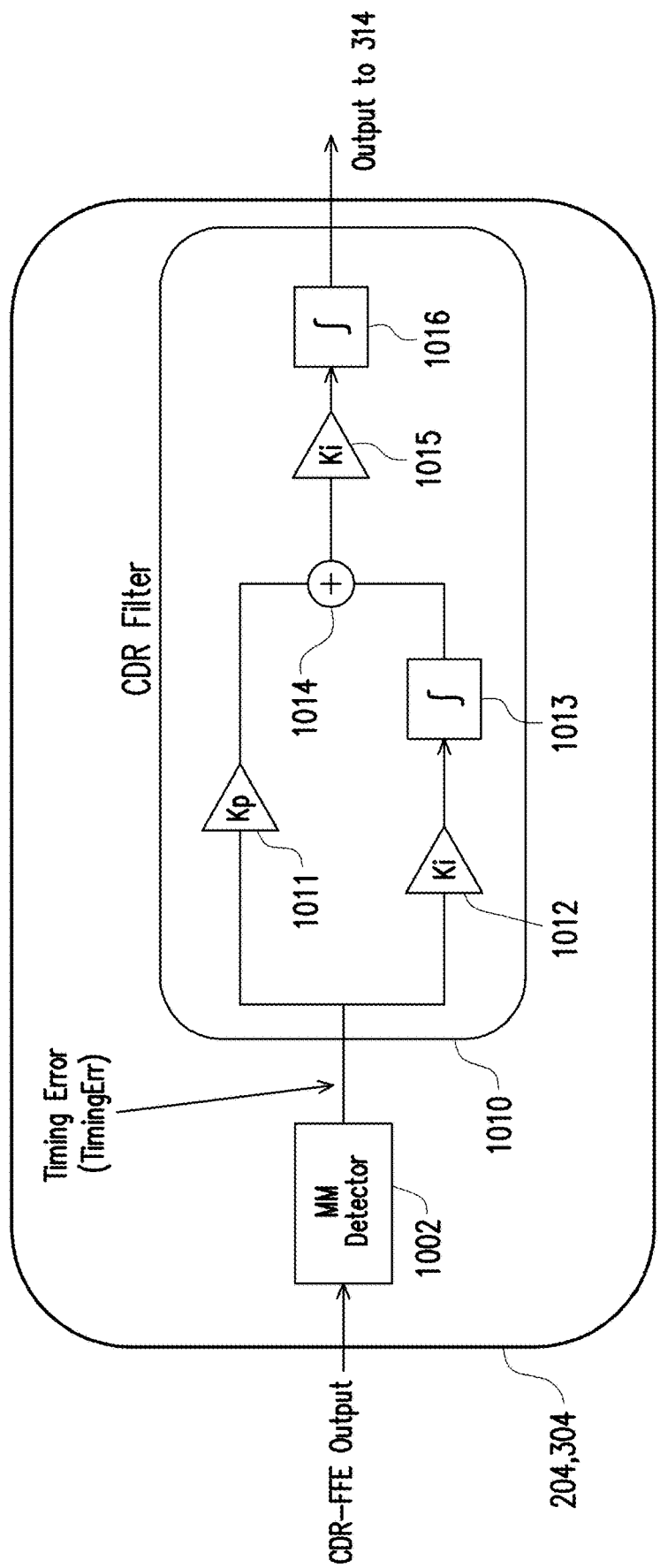
FIG. 10 schematically illustrates the filter of the MM Detector CDR according to an embodiment of the disclosure.

FIG. 10 illustrates the filter of the MM Detector CDR according to an embodiment of the disclosure. The MM Detector CDR 304 includes the MM Detector 1002 and the CDR Filter 1010. The CDR Filter 110 includes the proportional equalizer 1011, the first integral equalizer 1012, the first integration unit 1013, the adder 1014, the second integral equalizer 1015, and the second integration unit 1016. The MM Detector 1002 receives the signal from, for example, the CDR FFE output. The MM Detector 1002 calculates the Timing Error according to the pre-cursor and the post-cursor (TimingErr=Pre-Cursor–Post-Cursor). The MM Detector 1002 couples to the CDR Filter 1010 and passes the Timing Error to the CDR Filter 1010. The CDR Filter is composed by a $2^{nd}$ order filter and configured to filter the Timing Error. Specifically, the MM Detector 1002 couples to the proportional equalizer 1011 and the first integral equalizer 1012. The first integral equalizer 1012 is coupled to the first integration unit 1013. The first integration unit 1013 and the proportional equalizer 1011 are coupled to the adder 1014. The second integral equalizer is coupled to the adder 1014 and the second integration unit 1016. The second integration unit 1016 generates the filter output for the MUX 314.

In summary, the apparatus and method including the controller for data communication system is proposed. The controller (i.e., 301) includes the plurality of units with the specific structure and sequence to process the input data in order to generate the recovered data clock having the optimum frequency and phase and the recovered data having the small BER. The controller (i.e., 301) includes the Envelope Detector CDR 306 to detect the envelop data peak representing the optimal recovered data clock and the Envelop Detector CDR also has a logic to calculate the 'Pre_Cursor–Post_Cursor' value at the output of CDR FFE which is then used by the MM detector CDR to lock to this true peak phase and track it continuously. Therefore, by using the optimum recovered data clock, the recovered data having the small BER can be generated.

According to some embodiments, a controller of a data communication apparatus is configured to generate a recovered data clock and a recovered data from an input data received through an analog to digital converter (ADC). The controller includes a first equalizer, a first multiplexer, a first detector, a second detector, a second multiplexer, a data clock generator, and a second equalizer. The first equalizer is coupled to the ADC and configured to receive and equalize the input data. The first multiplexer is coupled to the first equalizer and the ADC. The first detector is coupled to the first equalizer and configured to detect an optimum input data sampling phase, wherein the optimum input data sampling phase represents the input data peak. The second detector, coupled to the first multiplexer and configured to generate an envelope data according to the input data and detect peak of envelop with respect to input data sampling phase, wherein the peak of envelop represents the envelope data peak. The second multiplexer is coupled to the first detector and the second detector. The data clock generator is coupled to the multiplexer and the ADC and configured to generate the recovered data clock. The second equalizer is coupled to the ADC and configured to generate the recovered data. The second multiplexer is configured to select second detector output during an initial envelope data peak detection, and after the second detector is locked to the optimum input data sampling phase, the second multiplexer is configured to select first detector output.

According to some embodiments, the second detector includes an absolute module, an average module, a first delay module, a sign module, and an adder. The absolute module is coupled to the ADC and configured to generate absolute data corresponding to the input data. The average module is coupled to the absolute module and configured to calculate average data from the absolute data. The first delay module is coupled to the average module and configured to generate first delayed data from the average data. The sign module is coupled to the first delay module and the average module and configured to check whether the average data is increased or decreased with respect to the first delay data. The adder and a second delay module are coupled to the sign module and configured to detect an average data peak from the average data. The average data and the average data peak represent the envelope data and the envelope data peak respectively.

In some embodiments, the ADC sampling the input data at 1× rate (one sample per symbol) of the recovered data clock. In some embodiments, the second detector determines an optimal offset for the first detector. In some embodiments, the optimal offset calculated by the second detector is used by the first detector so that it locks to the optimum input data sampling phase that is detected by second detector.

In some embodiments, the first detector further includes a timing error detector and a filter module. The timing error detector is coupled to the first equalizer and configured to calculate a timing error according to the input data equalized by the first equalizer. The filter module is coupled to the timing error detector and configured to filter the timing error by using a second order filter.

In some embodiments, the input data peak detected by the first detector is governed by the optimal offser ('Pre_Cursor−Post_Cursor' value) calculated by the second detector. In some embodiments, the input data is PAM4. In some embodiments, the controller is implemented for 56 Gbps SERDES receiver or PCIE Gen6 receiver.

In some embodiments, a controller of a data communication apparatus is configured to generate a recovered data clock and a recovered data from an input data through an analog to digital converter (ADC). The controller includes a first equalizer, a first detector, a first multiplexer, a second detector, an adding unit, a first data clock generator, a second equalizer, and a third detector. The first equalizer is coupled to the signal converter circuit and configured to equalize the input data as an equalized data. The first detector is coupled to the first equalizer and configured to detect an input data peak from the input data. The first multiplexer is coupled to the first equalizer and the signal converter circuit. The second detector is coupled to the first multiplexer and configured to generate an envelope data from the input data or the equalized data and detect envelope data peak from the envelope data. The adding unit is coupled to the second detector and the third equalizer. The first data clock generator is coupled to the adding unit and the signal converter circuit and configured to generate the recovered data clock. The second equalizer is coupled to the signal converter circuit and configured to generate the recovered data. The third detector is coupled to the signal converter circuit and the adding unit and configured to generate a data phase code or a corrected input data peak according to the input data peak. The adder generates the ADC Sampling phase by adding the phase value from the second detector and the third detector. This sampling phase will lock to the envelop data peak.

According to some embodiments, the third detector further includes a data phase detector, a second multiplexer, a third equalizer, and a second data clock generator. The data phase detector is coupled to the signal converter circuit and configured to match an input data sampling phase and an intermediate data clock. The second multiplexer is coupled to the second detector and the third detector. The third equalizer is coupled to the second multiplexer and configured to generate an equalized data. The second data clock generator is coupled to the third equalizer and the third detector and configured to generate the intermediate data clock.

According to some embodiments, the second detector includes an absolute module, an average module, a first delay module, a sign module, an adder and a second delay module. The absolute module is coupled to the signal converter circuit or the first multiplexer and configured to generate absolute data from signed data. The average module is coupled to the absolute module and configured to calculate average data from the absolute data. The first delay module is coupled to the average module and configured to generate first delay data from the average data. The sign module is coupled to the first delay module and the average module and configured to check whether the average data is increased or decreased with respect to the first delay data. The adder and the second delay module are coupled to the sign module and configured to detect an average data peak from the average data. The average data and the average data peak represent the envelope data and the envelope data peak respectively.

According to some embodiments, the average module is configured to calculate one data sample of the average data by averaging the absolute data within N unit interval, UI, for a symbol rate of 28 Gsps (56 Gbps PAM4). The one data sample of the average data represents the one data sample of the envelope data. According to some embodiments, next data samples are calculated by update rate of 28 Gsps/56 Gbps. 56 Gbps represents 56 Giga bytes per second, and 28 Gsps represents 28 Giga symbols per second encoded in PAM4, which is equivalent to 56 Gbps. The next data samples of the average data represent the next data samples of the envelope data.

According to some embodiments, a method of an apparatus for data communication, in which the apparatus includes a receiver configured to receive the received data having analog data form and a signal converter circuit configured to convert the received data from analog data form to digital data form using the recovered data clock, includes steps of equalizing the input data as an equalized data, detecting an input data peak from the input data, generating an envelope data from the input data or the equalized data and detect an envelope data peak from the envelope data, generating an offset value according to the envelope data peak and a corrected input data peak, generating the recovered data clock according to the offset value, generating the recovered data according to the recovered data clock, and generating the corrected input data peak according to the input data peak, generating an data sampling phase by adding phase value from a second detector and a third detector, and locking the envelop data peak to the sampling phase.

According to some embodiments, generating the corrected input data peak according to the input data peak further includes steps of generating an input data sampling phase according to the input data and an intermediate data clock, generating an intermediate input data peak according to the input data peak and the input data sampling phase, generating the corrected input data peak according to the input data peak and the input data sampling phase, and generating the intermediate data clock according to the corrected input data peak.

According to some embodiments, generating the envelope data from the input data or the equalized data and detecting the envelope data peak from the envelope data further includes steps of generating absolute data from signed data, calculating average data from the absolute data, generating first delay data from the average data, checking whether the average data is increased or decreased with respect to the first delay data, and detecting an average data peak from the average data. The average data and the average data peak represent the envelope data and the envelope data peak respectively.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A controller of a data communication apparatus configured to generate a recovered data clock and a recovered data from an input data received through an analog to digital converter (ADC) (102), comprising:
    a first equalizer (202), coupled to the ADC (102), configured to receive and equalize the input data;
    a first multiplexer (205), coupled to the first equalizer (202) and the ADC (102);
    a first detector (204), coupled to the first equalizer (202), configured to detect an optimum input data sampling phase, wherein the optimum input data sampling phase represents an input data peak;
    a second detector (206), coupled to the first multiplexer (205), configured to generate an envelope data according to the input data and to detect a peak of the envelope with respect to the input data sampling phase, wherein the peak of the envelope represents the envelope data peak;
    a second multiplexer (208), coupled to the first detector (204) and the second detector (206);
    a data clock generator (210), coupled to the multiplexer (208) and the ADC (102), configured to generate the recovered data clock; and
    a second equalizer (212), coupled to the ADC (102), configured to generate the recovered data,
    wherein the second multiplexer (208) is configured to select second detector output during an initial envelope data peak detection, and after the second detector (206) is locked to the optimum input data sampling phase, the second multiplexer (208) is configured to select first detector output.

2. The controller of claim 1, wherein the second detector (206) comprises:
    an absolute module (404), coupled to the ADC (102), configured to generate absolute data corresponding to the input data;
    an average module (406), coupled to the absolute module (404), configured to calculate average data from the absolute data;
    a first delay module (408), coupled to the average module (406), configured to generate first delayed data from the average data;
    a sign module (410), coupled to the first delay module (408) and the average module (406), configured to check whether the average data is increased or decreased with respect to the first delay data; and
    an adder (412) and a second delay module (414), coupled to the sign module (410), configured to detect an average data peak from the average data,
    wherein the average data and the average data peak represent the envelope data and the envelope data peak respectively.

3. The controller of claim 1, wherein the ADC samples the input data at a rate of one sample per symbol according to the recovered data clock.

4. The controller of claim 1, wherein the second detector (206) determines an optimal offset for the first detector (204),
    wherein the optimal offset calculated by the second detector (206) is used by the first detector (204) so that it locks to the optimum input data sampling phase that is detected by second detector (206).

5. The controller of claim 1, wherein the first detector (204, 304) further comprises:
    a timing error detector (1002), coupled to the first equalizer (202), and configured to calculate a timing error according to the input data equalized by the first equalizer (202); and
    a filter module (1010), coupled to the timing error detector (1002), and configured to filter the timing error by using a second order filter.

6. The controller of claim 4, wherein the input data peak detected by the first detector is governed by the optimal offset calculated by the second detector (206, 306).

7. The controller of claim 1, wherein the input data is 4-PAM.

8. The controller of claim 1, wherein the controller is implemented for a 56 Gbps SERDES receiver or a PCIE Gen6 receiver.

9. A controller of a data communication apparatus configured to generate a recovered data clock and a recovered data from an input data through an analog to digital converter (ADC) (102), comprising:
a first equalizer (202), coupled to the ADC (102), configured to receive and equalize the input data as an equalized data;
a first detector (304), coupled to the first equalizer (202), configured to detect an input data peak from the input data;
a first multiplexer (308), coupled to the first equalizer (202) and the ADC (102);
a second detector (306), coupled to the first multiplexer (308), configured to generate an envelope data according to the input data or the equalized data and detect an envelope data peak from the envelope data;
an adding unit (318), coupled to the second detector (306);
a first data clock generator (310), coupled to the adding unit (318) and the ADC (102), configured to generate the recovered data clock;
a second equalizer (212), coupled to the ADC (102), configured to generate the recovered data; and
a third detector (330), coupled to the ADC (102), the first detector (304), and the adding unit (318), configured to generate a corrected input data peak according to the input data peak,
wherein the adder (318) generates an ADC sampling phase by adding phase value from the second detector (306) and the third detector (330).

10. The controller of claim 9, wherein the third detector (330) further comprises:
a data phase detector (322), coupled to the ADC (102), configured to generate an input data phase according to the input data and an intermediate data clock;
a second multiplexer (314), coupled to the first detector (304) and the data phase detector (322), configured to generate an intermediate input data peak according to the input data peak and the input data phase;
a third equalizer (316), coupled to the second multiplexer (314) and the adding unit (318), configured to generate the corrected input data peak; and
a second data clock generator (320), coupled to the third equalizer (316) and the third detector (322), configured to generate the intermediate data clock.

11. The controller of claim 10, wherein the second detector (206) comprises:
an absolute module (404), coupled to the first multiplexer (308), configured to generate absolute data;
an average module (406), coupled to the absolute module (404), configured to calculate average data from the absolute data;
a first delay module (408), coupled to the average module (406), configured to generate first delay data from the average data;
a sign module (410), coupled to the first delay module (408) and the average module (406), configured to check whether the average data is increased or decreased with respect to the first delay data; and
an adder (412) and a second delay module (414), coupled to the sign module (410), configured to detect an average data peak from the average data,
wherein the average data and the average data peak represent the envelope data and the envelope data peak respectively.

12. The controller of claim 11, wherein the average module (406) is configured to calculate one data sample of the average data by averaging the absolute data within N unit interval, UI, for a symbol rate of 28 Gsps (56 Gbps 4-PAM),
wherein the one data sample of the average data represents the one data sample of the envelope data.

13. The controller of claim 12, wherein next data samples are calculated by an update rate of 28 Gsps/56 Gbps, 56 Gbps represents 56 Giga bytes per second, and 28 Gsps represents 28 Giga symbols per second encoded in 4-PAM, which is equivalent to 56 Gbps.
wherein the next data samples of the average data represent the next data samples of the envelope data.

14. A method of a data communication apparatus,
wherein the apparatus comprises a controller configured to generate a recovered data clock and a recovered data from an input data through an analog to digital converter (ADC) (102), comprising:
receiving and equalizing the input data as an equalized data;
detecting an input data peak from the input data;
generating an envelope data according to the input data or the equalized data and detecting an envelope data peak from the envelope data;
generating an offset value according to the envelope data peak and a corrected input data peak;
generating the recovered data clock according to the offset value;
generating the recovered data according to the recovered data clock;
generating the corrected input data peak according to the input data peak;
generating a data sampling phase by adding phase value from a second detector (306) and a third detector (330); and
locking the envelope data peak to the generated data sampling phase.

15. The method of claim 14, wherein generating the corrected input data peak according to the input data peak further comprises:
generating an input data phase according to the input data and an intermediate data clock;
generating an intermediate input data peak according to the input data peak and the input data phase;
generating the corrected input data peak according to the input data peak and the input data phase; and
generating the intermediate data clock according to the corrected input data peak.

16. The method of claim 15, wherein generating the envelope data according to the input data or the equalized data and detecting the envelope data peak from the envelope data further comprises:
generating absolute data according to the input data;
calculating average data according to the absolute data;
generating first delay data according to the average data;
checking whether the average data is increased or decreased with respect to the first delay data; and
detecting an average data peak from the average data,
wherein the average data and the average data peak represent the envelope data and the envelope data peak respectively.

17. The method of claim 16, wherein next data samples are calculated by an update rate of 28 Gsps/56 Gbps, 56 Gbps represents 56 Giga bytes per second, and 28 Gsps represents 28 Giga symbols per second encoded in 4-PAM, which is equivalent to 56 Gbps,
  wherein the next data samples of the average data represent the next data samples of the envelope data.

18. The method of claim 14, wherein the ADC samples the input data at a rate of one sample per symbol according to the recovered data clock.

19. The method of claim 14, wherein the input data is 4-PAM.

20. The method of claim 14, wherein generating the recovered data clock and the recovered data from the input data through the ADC (102) is implemented for a 56 Gbps SERDES receiver or a PCIE Gen6 receiver.

* * * * *